(12) United States Patent
Hori et al.

(10) Patent No.: US 6,289,164 B1
(45) Date of Patent: Sep. 11, 2001

(54) MOVING PICTURE RECORDING DEVICE AND MOVING PICTURE REPRODUCING DEVICE

(75) Inventors: Yoshihiro Hori, Gifu; Mineki Taoka, Kasukabe, both of (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 0 days.

(21) Appl. No.: 09/230,264

(22) PCT Filed: Jun. 30, 1997

(86) PCT No.: PCT/JP97/02256

§ 371 Date: Jan. 22, 1999

§ 102(e) Date: Jan. 22, 1999

(87) PCT Pub. No.: WO98/04085

PCT Pub. Date: Jan. 29, 1998

(30) Foreign Application Priority Data

Jul. 24, 1996 (JP) .................................................. 8-194838

(51) Int. Cl.⁷ ............................... H04N 5/76; H04N 5/781
(52) U.S. Cl. .............................................. 386/46; 386/124
(58) Field of Search ............................. 386/46, 109, 111, 386/112, 27, 33, 124, 40, 68, 67, 125, 70, 45, 95; H04N 5/76, 5/781

(56) References Cited

U.S. PATENT DOCUMENTS 5,377,051  * 12/1994  Lane et al. ........................ 360/33.1

FOREIGN PATENT DOCUMENTS

| 0 668 697 | 8/1995 | (EP) . |
| 6-46368 | 2/1994 | (JP) . |
| 7-231427 | 8/1995 | (JP) . |
| 8-163499 | 6/1996 | (JP) . |

* cited by examiner

*Primary Examiner*—Robert Chevalier
(74) *Attorney, Agent, or Firm*—Armstrong, Westerman, Hattori, McLeland & Naughton, LLP

(57) ABSTRACT

A motion image recording apparatus inputs an image code train coded according to intra-frame coding or inter-frame coding in order to easily perform data retrieving in fast-forward reproduction of motion image data recorded according to prediction coding. A header detection circuit (11) detects a header of a specific frame from an input code train. A recording control circuit (16) outputs data related to a record unit of a recording medium (15). A redundant bit insert control circuit (12) inserts a redundant bit into the input code train such that the detected header is located at the leading end of the record unit.

7 Claims, 22 Drawing Sheets

MOVING PICTURE RECORDING DEVICE AND MOVING PICTURE REPRODUCING DEVICE

TECHNICAL FIELD

The present invention relates to a motion image recording apparatus and a motion image reproduction apparatus, and particularly to digital motion image recording apparatus and motion image reproduction apparatus that perform recording and reproduction by using an image data train generated according to such systems as MPEG and H.261 by which intra-frame coding and inter-frame coding employing motion prediction as well as compression coding by the variable-length code are carried out.

BACKGROUND ART

MPEG2 (Motion Picture Coding Expert Group Phase 2, ISO/IEC 13818-2) is standardized and widely used as a coding system for coding a motion image to record it on the digital recording media. The coding system is utilized for recording information and in addition, utilized in the fields of broadcasting and communication such as digital broadcasting and digital transmission.

The motion image compression coding system represented by the MPEG2 is a system combining intra-frame coding and inter-frame coding employing motion prediction, and compression coding by the variable-length code.

According to the motion image compression coding system, data are formed of an intra-frame coded frame coded within a frame and an inter-frame coded frame coded by referring to another frame to compress data.

The intra-frame coded frame is referred to as I-Picture (Intra-Picture). The inter-frame coded frame includes P-Picture (Predictive-Picture) compressed by referring to a frame in the past and B-Picture (Bidirectional-Picture) compressed by referring to two frames respectively in the past and in the future.

The P-Picture is coded and decoded by referring to a reference frame (I-Picture or P-Picture that is a frame referred to) which is present in the nearest past in order of reproduction time, and B-Picture is coded and decoded by referring to a reference frame present in the nearest past and a reference frame present in the nearest future.

FIG. 16 briefly shows a reference relation between frames according to the system of compression coding for a digital motion image, implemented by combining the intra-frame coding and the inter-frame coding represented by MPEG2 (ISO/IEC 13818-2).

In the drawing, reference numerals 101–110 all indicate frames that are sequential in time. Frames 101 and 110 denoted by I in the drawing are referred to as I-picture according to MPEG2, that are intra-frame coded frames generated according to the intra-frame coding. These frames are compressed by a system that allows only the image data coded within the frame to be decoded, that is, the frame can be decoded individually.

Those frames denoted by P and B in the drawing are inter-frame coded frames compressed by referring to other frames and using a difference of data obtained by motion compensation.

The drawing illustrates that a frame indicated by the head of the arrow refers to the frame at which the starting point of the arrow locates for determining motion and difference in order to achieve compression. According to MPEG2, a frame referring to only a past frame is referred to as P-Picture, and a frame referring to image data in the past and future is referred to as B-Picture. Frames 104 and 107 indicated by P in the drawing are P-Pictures, and frames 102, 103, 105, 106, 108 and 109 indicated by B in the drawing are B-Pictures. For P-Picture, compression is performed by using P-Picture or I-Picture present in the nearest past in terms of time as a reference frame, and for B-Picture, compression is performed by referring to P-Picture or I-Picture in the past and future.

Therefore, all of the frames refer to frame 101 directly or in a succeeding manner until frame 110 is presented that is I-Picture to be intra-frame coded next. Accordingly, frames 102–109 are compressed. In view of this, decoding of these P-Pictures and B-Pictures is impossible unless I-Picture to be intra-frame coded is initially decoded. A plurality of frames 101–109 in such a reference relation are all together referred to as GOP (Group of Pictures).

Further, the MPEG2 system employs the variable-length code. Accordingly, the quantity of data of each frame is not predetermined. For example, just an average quantity of data per unit time may satisfy a prescribed value in a long period such as GOP period formed of a plurality of frames, a sequence period formed of one or a plurality of GOP(s), or one program period.

FIG. 18 is presented for describing change of the quantity of data for every frame. Generally, a relation is established in the data quantity represented by I-Picture>P-Picture>B-Picture. However, the data quantity is not constant even if the frames are coded according to the same system.

In addition to the full-color motion image compression standard MPEG2 with its standardization promoted by ISO, MPEG (Motion Picture Coding Expert Group, ISO 11172-2) and H:261 series which is the standard of TV phone represent such compression coding scheme.

FIG. 17 illustrates a structure of a motion image recording apparatus that records an image data train coded according to this coding system on a recording medium.

Various recording media available for digital recording such as the optical disk, magnetic disc and magnetic tape can be used as a recording medium 15.

A recording conversion circuit 13 performs processing necessary for recording an input data train on the recording medium, such as blocking, addition of any error-correcting code, and modulation. Data thus processed are output as block data of a record unit of recording medium 15.

A recording control circuit 16 is a control circuit performing any control for recording an image data train on recording medium 15.

An input image code train is converted by recording conversion circuit 13 to any form appropriate for recording, and thereafter used as data block of a record unit to be recorded unit by unit of recording on recording medium 15.

Where the image code train is recorded for each record unit, it is impossible to specify the position at which the leading end of a frame in the image code train on the recording medium is located in the record unit of the recording medium (see FIG. 18).

FIG. 19 illustrates a specific example of a motion image reproduction apparatus for reproduction of a recording medium on which a data train is recorded as described above.

A reproduction control circuit 25 is a control circuit that directly controls reading from a recording medium 15. A reproduction conversion circuit 21 is a circuit that performs processing corresponding to the processing by recording conversion circuit 13, that is, demodulation, error correction, cancellation of blocking, in writing for recording medium 15.

A header detection circuit 22 is a circuit for searching the head and tail of I-Picture, for example, in order to reproduce only a reference frame from the data train read from recording medium 15, in any special reproduction such as high-speed reproduction.

In normal reproduction, the block data read film recording medium 15 unit by unit of record are converted back to a reproduction image code train by reproduction conversion circuit 21 and provided as a continuous image code train by a buffer memory 23. The image code train is reproduced as an image signal by a decoding circuit 24 to be provided as a reproduction image.

The high speed reproduction can be achieved by, for example, reproducing only those intra-frame coded frames in turn that can be reproduced without depending on any other frames.

FIG. 20 illustrates a relation of frames that are reproduced in the high speed reproduction.

In this drawing, I denotes I-Picture, P denotes P-Picture, and B denotes B-Picture. The time passes from left to right in the drawing. This drawing represents that the frame indicated by the head of the arrow is reproduced after the frame located at the starting point of the arrow is reproduced. The high speed reproduction is easily achieved by reproducing only the image code train corresponding to the intra-frame coded frame.

Alternatively, another type of high speed reproduction can be achieved by reproducing I-Picture which is an intra-frame coded frame and P-Picture which is an inter-frame coded frame in turn as shown in FIG. 21. The reason is that P-Picture is a frame referring to another frame and can be decoded by initially reproducing a reference frame present before the P-Picture.

Further, high speed reverse reproduction can be implemented by reproducing only I-Pictures in the reverse direction as shown in FIG. 21. The drawing represents that the frame located at the starting point of the arrow is first reproduced and then the frame indicated by the head of the arrow is reproduced.

Header detection circuit 22 finds the head and tail of the frame by reading a header code located at the leading end of each frame of the image code train. Header detection circuit 22 further determines a frame coding type shown by the header code (whether the frame is I-Picture, P-Picture or B-Picture) to detect a frame to be used for the special reproduction.

Header detection circuit 22 instructs buffer memory 23 to write an image code train of a frame upon finding the leading end of the frame to be used for the special reproduction, and then stops writing operation of buffer memory 23 upon detecting the tail thereof. Header detection circuit 22 thereafter searches a leading end of an image code train to be next reproduced. This operation is repeated.

Decoding circuit 24 reads an image code train from buffer memory 23 and outputs it as a reproduction image. The special reproduction is thus implemented.

However, according to a conventional technique, conversion by reproduction conversion circuit 21 and determination by header detection circuit 22 as to which frame is I-Picture or P-Picture are required in order to search a leading end of each frame in the high speed reproduction. In other words, the conventional technique has a disadvantage of the complicate frame retrieving process in the special reproduction. Accordingly, a remarkably high speed reading apparatus is required. In addition, if the reading speed is not enough, the retrieving speed cannot fully follow the reproduction speed to cause any imperfection in a reproduction image, or interrupt the special reproduction to be completed.

This problem is more serious in the reverse reproduction since the reading speed should be higher than that for the high speed reproduction.

Japanese Patent Laying-Open No. 6-46368 discloses the technique of matching data with a record unit for every GOP period in order to easily read motion image data. However, it is impossible to match a leading end of a specific frame such as I-Picture and P-Picture with a record unit.

The present invention is made to solve such problems as described above. The first object of the present invention is to provide a reproduction apparatus that can efficiency reproduce only a specific frame from an image data train coded frame by frame according to intra-frame coding and inter-frame coding.

The second object of the present invention is to provide a recording apparatus that can efficiency record a motion image on a recording medium for such a reproduction apparatus.

DISCLOSURE OF INVENTION

In order to achieve the objects above, a motion image recording apparatus according to one aspect of the present invention includes input means for inputting an image code train that is compressed frame by frame according to intra-frame coding or inter-frame coding, detection means for detecting a specific frame from the input image code train, and control means for controlling to allow the detected specific flame to match a record unit of a recording medium and to be recorded.

Further, the control means include insert means for inserting a code into the input image code train to allow the detected specific frame to match the record unit of the recording medium and to be recorded.

Further, the input image code train includes a redundant bit, and the control means include delete means for deleting the redundant bit.

Further, the control means include measure means for measuring the quantity of codes between a leading end of a specific frame and a leading end of a next specific frame based on the result of detection by the detection means.

Further, the control means control to allow the quantity of the input image code train to be approximately equal to the quantity of an image code train to be recorded.

Further, the control means include first arithmetic means for calculating a difference between the quantity of the input image code train and the quantity of the image code train to be recorded, second arithmetic means for counting the quantity of the redundant bit present between detected specific frames and dividing the counted quantity by the record unit to calculate the remainder, and delete means for deleting the redundant bit based on the result of the calculation by the first and second arithmetic means.

Further, the control means include eliminate means for eliminating the redundant bit contained in the input image code train, first arithmetic means for calculating the remainder of a recording region when the quantity of data of the image code train from which the redundant bit present between the detected specific frames has been eliminated is divided into record units, second arithmetic means for calculating the quotient and remainder generated by dividing the quantity of the eliminated redundant bit present between the detected specific frames by the record unit, and insert means for inserting a redundant bit into the input image code train based on the result of calculation by the first and second arithmetic means.

Further, the input means include storage means for temporarily storing the input image code train.

Further, the input means include a storage medium on which an image code train is stored, and reading means for reading the image code train from the storage medium.

Further, the specific frame is an intra-frame coded frame.

Further, the specific frame is the intra-frame coded frame, and an inter-frame coded frame that refers to only one frame.

According to another aspect of the present invention, a motion image reproduction apparatus includes reading means for reading an image code train from a recording medium on which the image code train coded frame by frame according to intra-frame coding or inter-frame coding is recorded such that a leading end of a frame that could be a special reproduction frame is located at a leading end of a record unit of the recording medium, detection means for detecting a header corresponding to a start position of coded data of the frame that could be the special reproduction frame from the image code train read by the reading means, and control means for controlling the reading means so as to allow a prescribed quantity of data less than the record unit to be read from the leading end of the record unit of the recording medium.

According to the present invention, the specific frame can be read efficiently from the recording medium to achieve easy reproduction of a motion image. In addition, a motion image recording apparatus can be provided that can record a motion image on a recording medium suitable for such reproduction.

BEST MODE FOR CARRYING OUT THE INVENTION

Preferred embodiments of the present invention are hereinafter described in conjunction with the drawings using a data train according to MPEG2 system as one example. However, the invention can be effectively implemented according to another coding system.

According to the MPEG2 system, a frame which is reproduced in any special reproduction such as high speed reproduction is a reference frame (a frame referred to by another frame, I-Picture only, or I-Picture and P-Picture). It is noted that those circuits having the same function have the same reference numbers and description thereof is not repeated.

Figure 1:
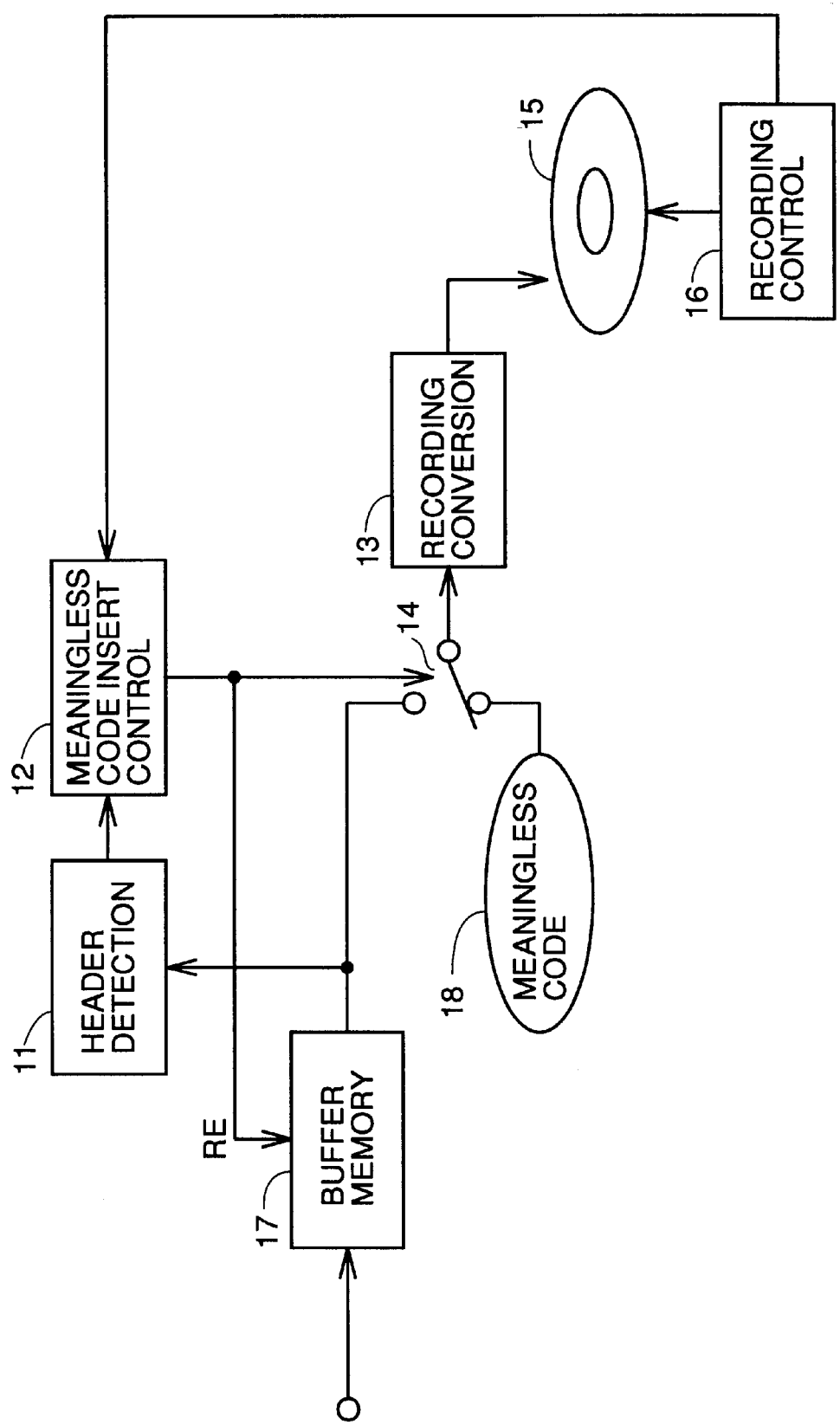
FIG. 1 is a block diagram illustrating a structure of a motion image recording apparatus according to the first embodiment of the present invention.

FIG. 1 is a block diagram of a motion image recording apparatus according to the first embodiment of the present invention.

Referring to the drawing, a header detection circuit 11 is a circuit that retrieves the position of a start code of a header (header position) indicating the start position of data of a reference frame arranged in a data train and reproduced in the special reproduction, and outputs a header detection signal.

If an image code train is a code train according to the MPEG2, a code train of start codes indicating the start position of attached information of higher layers such as sequence header, GOP header, and picture header, specifically, 32 bits formed of 23 of 0's and following 1's ("00000000000000000000001 . . . ") is inserted into the data train. The start codes form an image code train that can be easily identified.

Following the start code of the picture header, information on a frame coding type (whether the frame is I-Picture, P-Picture or B-Picture) is arranged as data. Accordingly, the start position of a flame available as a frame for the special reproduction can be determined from the picture header and following frame coding type (motion prediction coding mode).

In the hierarchy of coding, the GOP header or the picture header of I-Picture follows immediately after the sequence header, and the picture header of I-Picture follows immediately after the GOP header. Since information necessary for reproducing a frame is coded and recorded in the sequence header and the GOP header, the start position of the reference frame may include these headers if the sequence header or the GOP header precedes the picture header of I-Picture.

A redundant bit insert control circuit 12 changes the state of a switch 14 so as to output a redundant bit 18 according to the header detection signal from header detection circuit 11 and information on the boundary of a record unit from a recording control circuit 16. Further, a control signal RE is simultaneously output for stopping output from a buffer memory 17. Following this, redundant bit insert control circuit 12 changes the state of switch 14 to allow the content of buffer memory 17 to be output, after a redundant bit up to the boundary of the record unit obtained from recording control circuit 16 is recorded. Concurrently, control signal RE is output for restarting output from the buffer memory.

Buffer memory 17 absorbs a difference between the input rate of an image train and the processing rate in a recording conversion circuit, and stops reading operation when the redundant bit is inserted, according to control signal RE.

Recording conversion circuit 13 is a signal processing circuit that converts an image data train in which redundant bit 18 has been inserted to any form which can be recorded on a recording medium.

Recording control circuit 16 is a circuit that carries out any control necessary for recording for recording medium 15.

According to the MPEG2 system, 0 which is inserted immediately before the start codes (32-bit code formed of 23 of 0's and following 1's) attached to a code generated by coding reproduction information located at a layer higher than that of image data such as the sequence header, GOP header, and picture header is a redundant bit. The number of 0's to be inserted is not limited.

Figure 2:
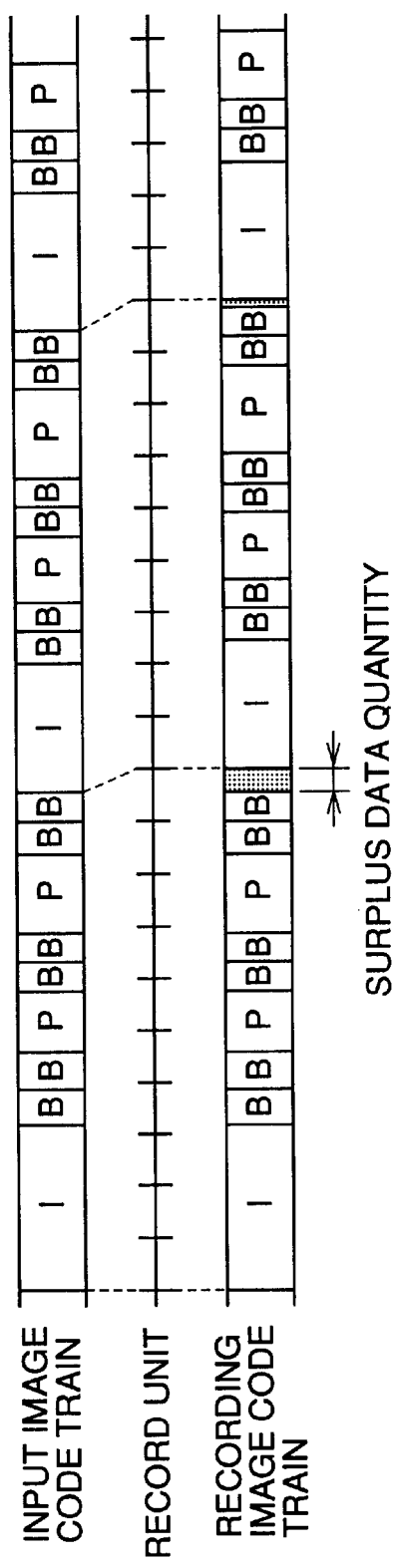
FIG. 2 is a first illustration showing one example of processing by the apparatus shown in FIG. 1.

FIG. 2 shows the result of processing performed for I-Picture.

In the drawing, I denotes I-Picture, P denotes P-Picture, and B denotes B-Picture. Since the upper input image code train in the drawing is coded by the variable-length code, it is impossible to specify which frame is recorded at which position on recording medium 15 if the input image code train is recorded as it is. By a process according to this embodiment, the lower recording image code train in the drawing is recorded on the recording medium. Specifically, redundant bit 18 is inserted into the hatched region in the drawing so as to match an image code train corresponding to I-Picture which is a reference frame with the start position of a record unit of recording medium 15.

The insertion of the redundant bit enables I-Picture to be detected easily in reproduction. A stable special reproduction can be implemented easily with a reproduction apparatus provided with a low-speed reading apparatus.

Figure 20:
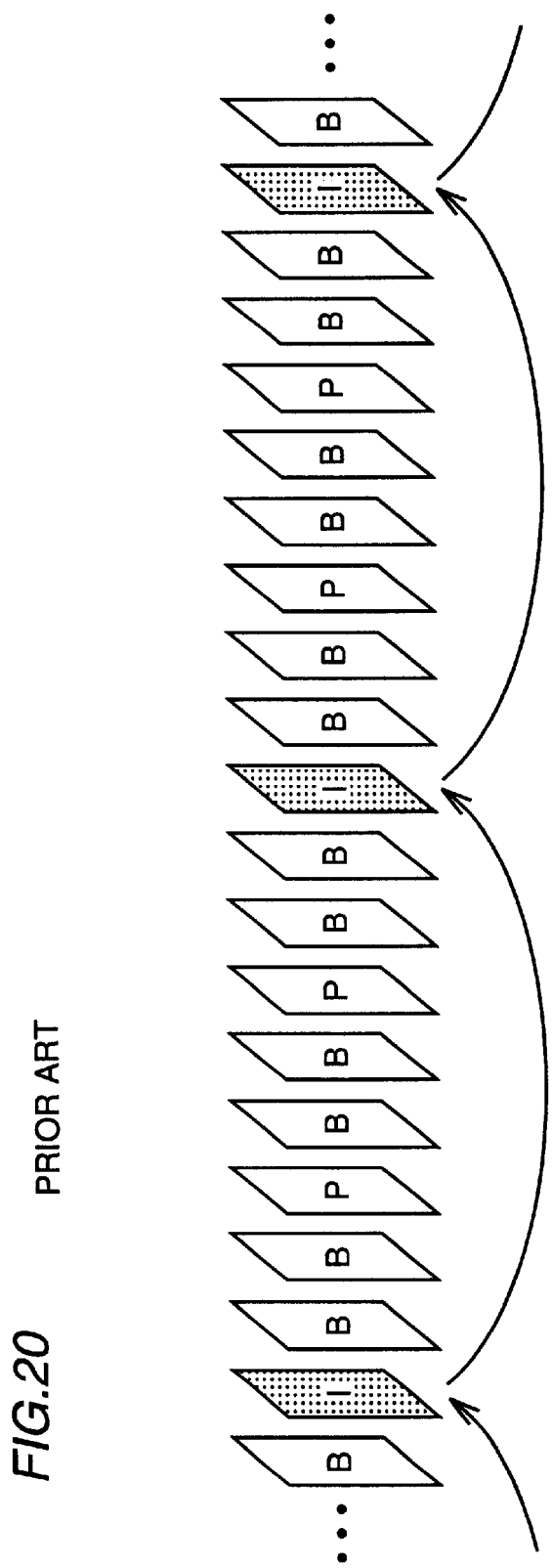
FIG. 20 is a first illustration for describing high speed reproduction.

In other words, high speed reproduction illustrated in FIG. 20 can be achieved by retrieving only the leading end of each record unit successively to easily detect a leading end of an image code train to be reproduced.

Figure 3:
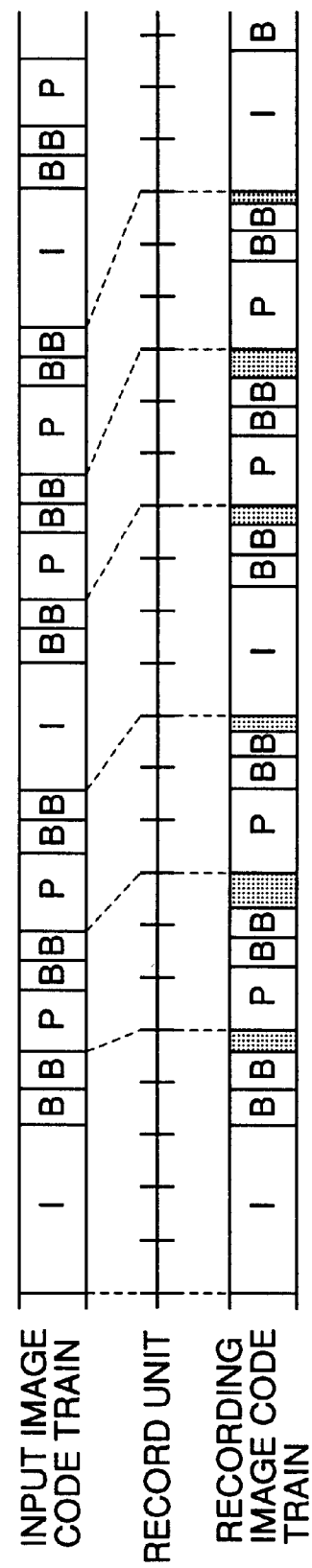
FIG. 3 is a second illustration showing one example of processing by the apparatus shown in FIG. 1.

FIG. 3 illustrates another example of processing by the apparatus according to this embodiment.

In this example, redundant bit 18 is inserted such that the leading ends of I-Picture and P-Picture are located at the leading ends of record units of recording medium 15. High speed retrieving of a frame to be reproduced is thus achieved by similarly processing for P-Picture in the high speed reproduction illustrated in FIG. 21. The reverse reproduction illustrated in FIG. 22 is possible by any of the processing illustrated in FIGS. 2 and 3.

Figure 21:
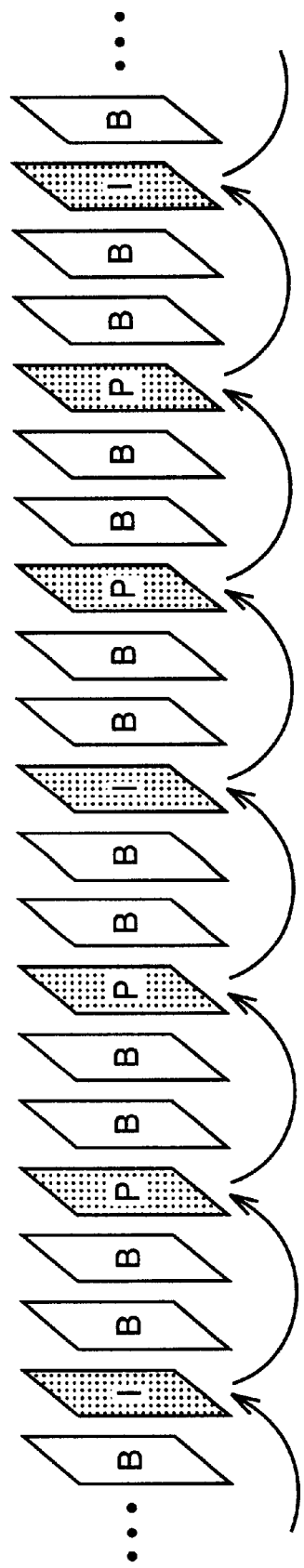
FIG. 21 is a second illustration for describing the high speed reproduction.
Figure 22:
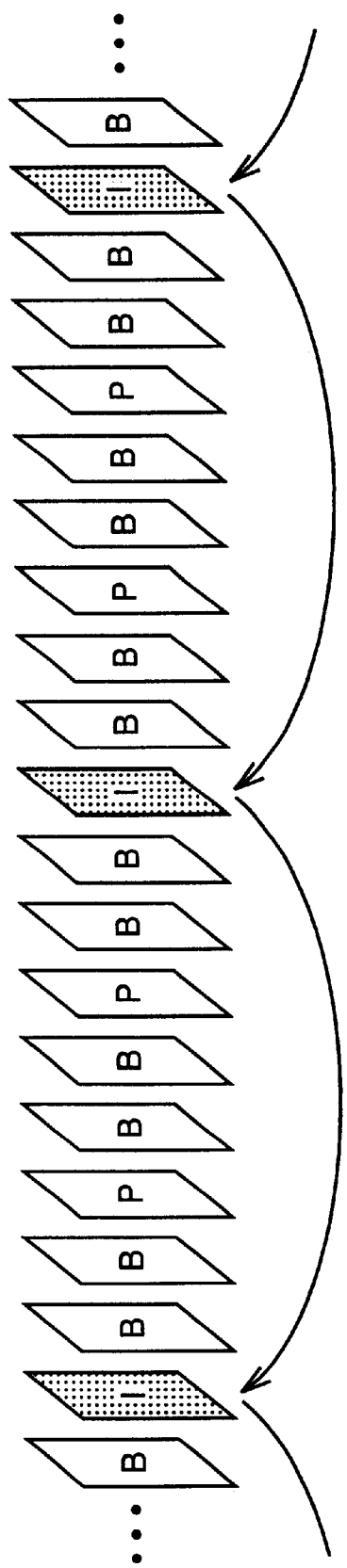
FIG. 22 is an illustration for describing reverse reproduction.

Although examples of the special reproduction illustrated in FIGS. 20–22 are herein provided, the special reproduction is not limited to such examples. In the example of processing illustrated in FIG. 2, retrieving can be implemented at high speed where the leading end of I-Picture is retrieved, and in the processing example of FIG. 3, high speed processing is achieved where the leading ends of I-Picture and P-Picture are retrieved.

Figure 4:
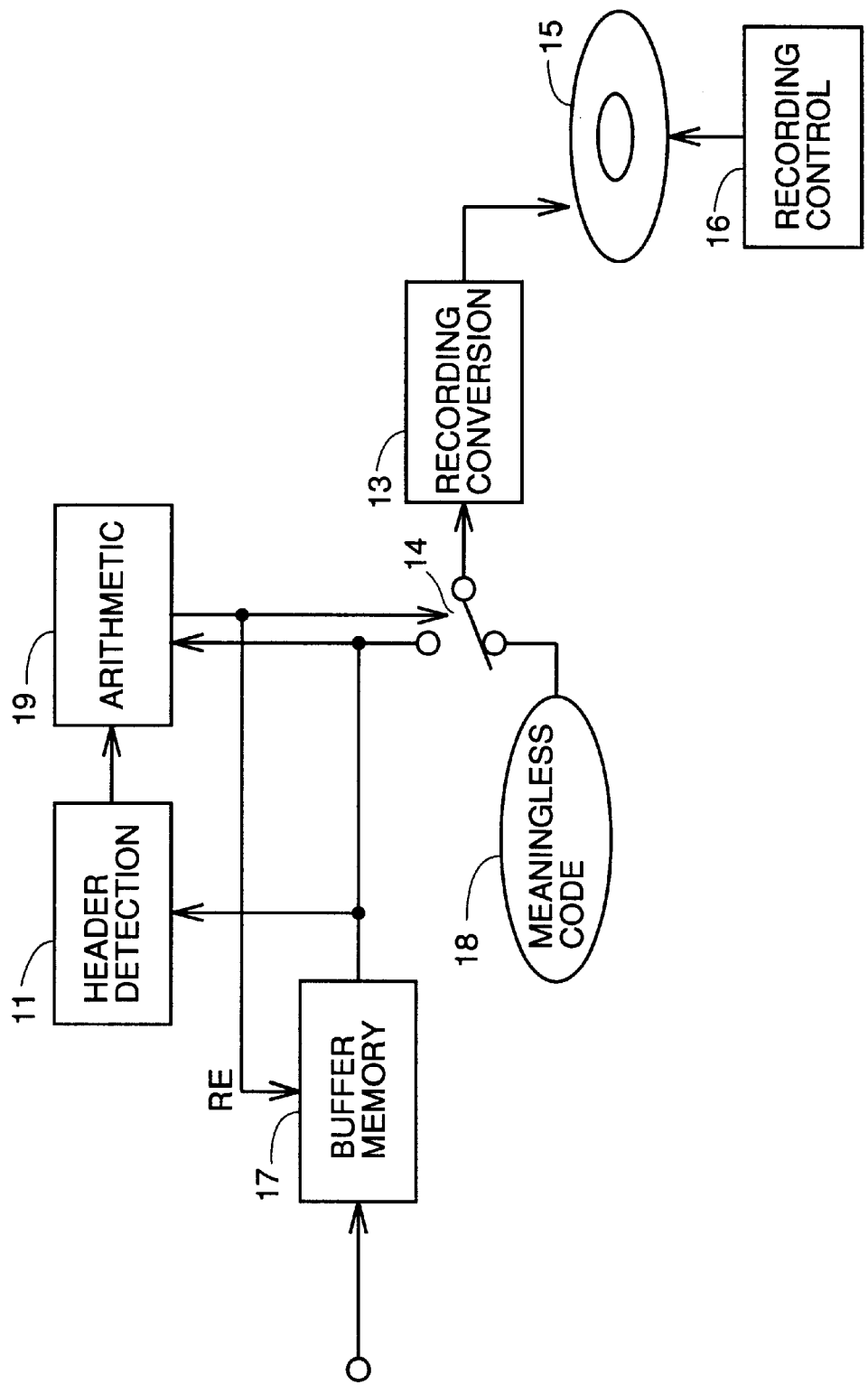
FIG. 4 is a block diagram illustrating a motion image recording apparatus according to the second embodiment of the present invention.

FIG. 4 is a block diagram illustrating a structure of a motion image recording apparatus according to the second embodiment of the present invention.

In the apparatus of this embodiment, redundant bit insert control circuit 12 of the apparatus of the embodiment shown in FIG. 1 is replaced with an arithmetic circuit 19. In addition, the signal indicating the boundary between record units output from recording control circuit 16 is unnecessary.

Arithmetic circuit 19 counts the quantity of data of an image code train output from buffer memory 17 from the time at which a header is detected by a header detection circuit 11 to the time at which the next header is detected. Next, the counted value is divided by the quantity of data of the record unit. A surplus quantity of data is obtained by subtracting the remainder of the division from the quantity of the record unit. Arithmetic circuit 19 changes the state of a switch 14 in order to output a redundant bit corresponding to the surplus quantity of data. Simultaneously, arithmetic circuit 19 outputs a control signal RE for stopping output of a buffer memory 17.

After the redundant bit corresponding to the surplus quantity of data is output, arithmetic circuit 19 changes the state of switch 14 to allow the content of buffer memory 17 to be output. Arithmetic circuit 19 simultaneously outputs control signal RE for restarting output from buffer memory 17. The data illustrated in FIGS. 2 and 3 can thus be recorded similarly to the first embodiment.

Figure 5:
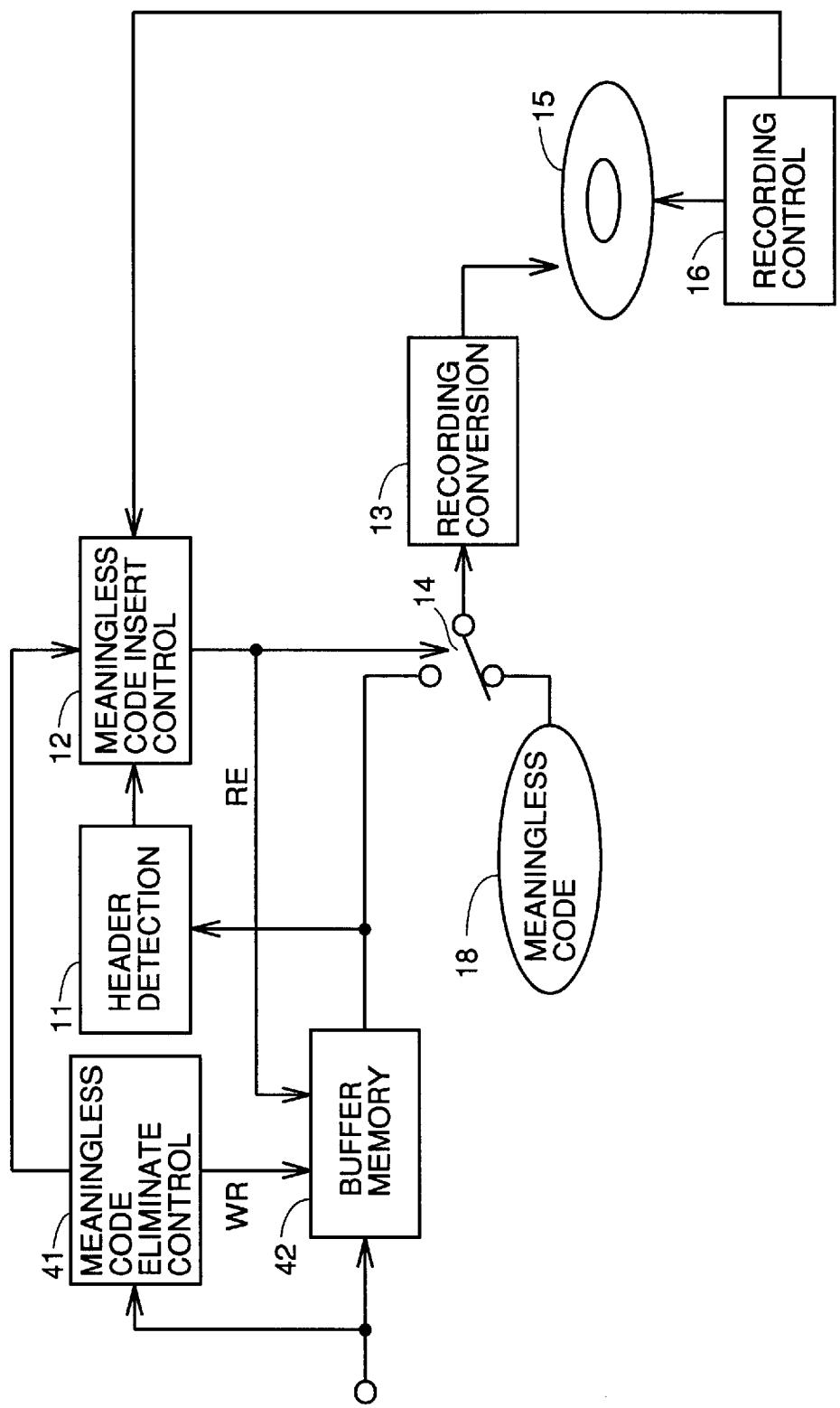
FIG. 5 is a block diagram illustrating a motion image recording apparatus according to the third embodiment of the present invention.

FIG. 5 is a block diagram showing a structure of a motion image recording apparatus according to the third embodiment of the present invention.

A redundant bit eliminate control circuit 41 is added to the apparatus of the embodiment shown in FIG. 1, and buffer memory 17 is replaced with a buffer memory 42 with writing thereof controlled by redundant bit eliminate control circuit 41, to implement the apparatus of FIG. 5.

Redundant bit eliminate control circuit 41 detects a redundant bit inserted for adjusting the quantity of data per unit time in the process of coding an image code train according to such a system as MPEG2 to perform compression coding by combining motion prediction and variable-length code. Redundant bit eliminate control circuit 41 outputs a control signal WR for stopping writing of an image code train to buffer memory 42 in response to the detection.

Buffer memory 42 stops writing of the redundant bit according to control signal WR. All redundant bits are thus eliminated.

A redundant bit insert control circuit 12 changes the state of a switch 14 to allow redundant bit 18 to be output according to a header detection signal from a header detection circuit 11. At this time, redundant bit insert control circuit 12 outputs a control signal RE so as to stop output of buffer memory 42.

Redundant bit insert control circuit 12 counts the total quantity of redundant bits deleted during the period from the time at which the header is detected by header detection circuit 11 to the time at which the next header is detected. Following this, switch 14 is controlled to allow a redundant bit corresponding to the quantity obtained by subtracting a certain amount (referred to as surplus data quantity in this embodiment) from the total quantity to be recorded on a recording medium. The amount is determined for matching the position of the header with the position of the record unit of the recording medium (see FIG. 6). In order to match the position of the boundary of the record unit with the position of the header, a signal output from a recording control circuit 16 is utilized. When recording of the redundant bit is completed, redundant bit insert control circuit 12 changes the state of switch 14 to start output of buffer memory 42, and simultaneously outputs a control signal RE for restarting output by the buffer memory.

In this way, redundant bit 18 is inserted such that the leading end of the reference frame is located at the leading end of the record unit of the recording medium. Further, an image code train having its quantity of data close to (approximately equal to) the data quantity of the input image code train can be recorded on recording medium 15.

Figure 6:
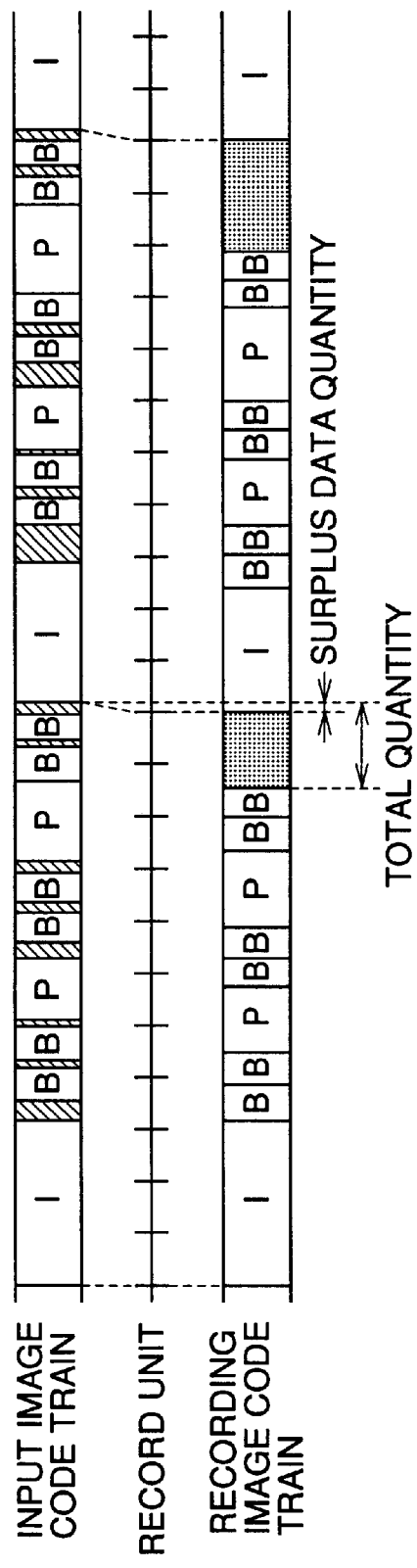
FIG. 6 is a first illustration showing one example of processing by the apparatuses of FIGS. 4 and 5.

FIG. 6 illustrates the result of processing performed for I-Picture only. In this drawing, I, P, and B respectively represent I-Picture, P-Picture and B-Picture. The region represented by oblique lines in the upper input image code train indicates a redundant bit inserted into the frame upon coding.

According to this embodiment, redundant bit 18 is inserted into the hatched region as illustrated in the lower train. The start position of the record unit of recording medium 15 can thus be matched with the leading end of I-Picture. The new image code train is recorded on the recording medium.

Figure 7:
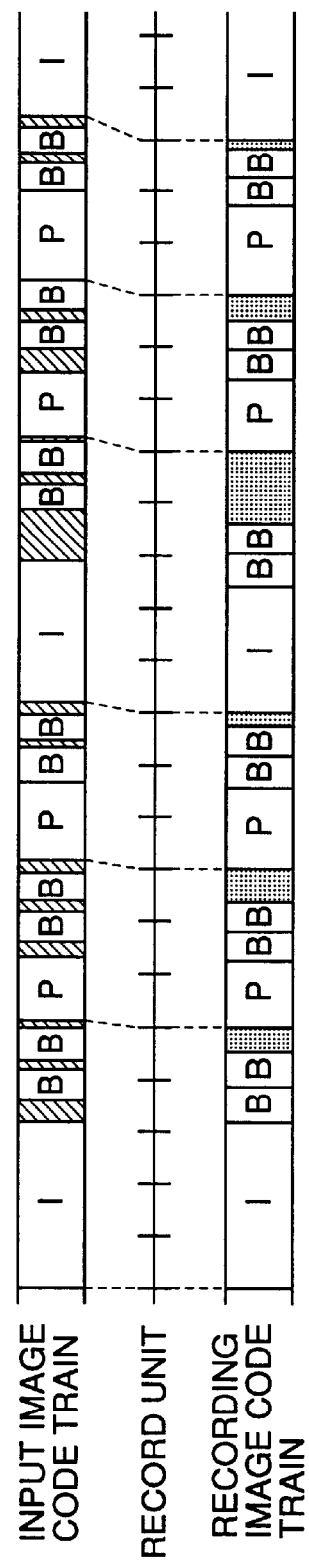
FIG. 7 is a second illustration showing one example of processing by the apparatuses of FIGS. 4 and 5.

FIG. 7 illustrates one example of another processing according to this embodiment. In this example, a redundant bit is inserted such that the leading ends of I-Picture and P-Picture are located at the leading ends of the record units of recording medium 15. The frame to be reproduced can be speedily retrieved in the high speed reproduction as shown in FIG. 21 by conducting similar control for P-Picture.

In FIGS. 6 and 7, a redundant bit equal to or more than one record unit is inserted depending on the circumstances. However, a redundant bit less than one record unit may be inserted if just the leading end of the reference frame should be matched with the boundary of the record unit. In this case, the quantity of data to be recorded could be less than the quantity of input coded data.

In this embodiment, a reproduction frame could be retrieved speedily in the reverse reproduction illustrated in FIG. 22. Although the examples of the special reproduction illustrated in FIGS. 20 and 21 are presented, the special reproduction is not limited to these examples. According to the example of processing in FIG. 6, high speed retrieving is possible when the leading end of I-Picture is retrieved, and according to the processing in FIG. 7, high speed processing is achieved when the leading ends of I-Picture and P-Picture are retrieved.

Figure 8:
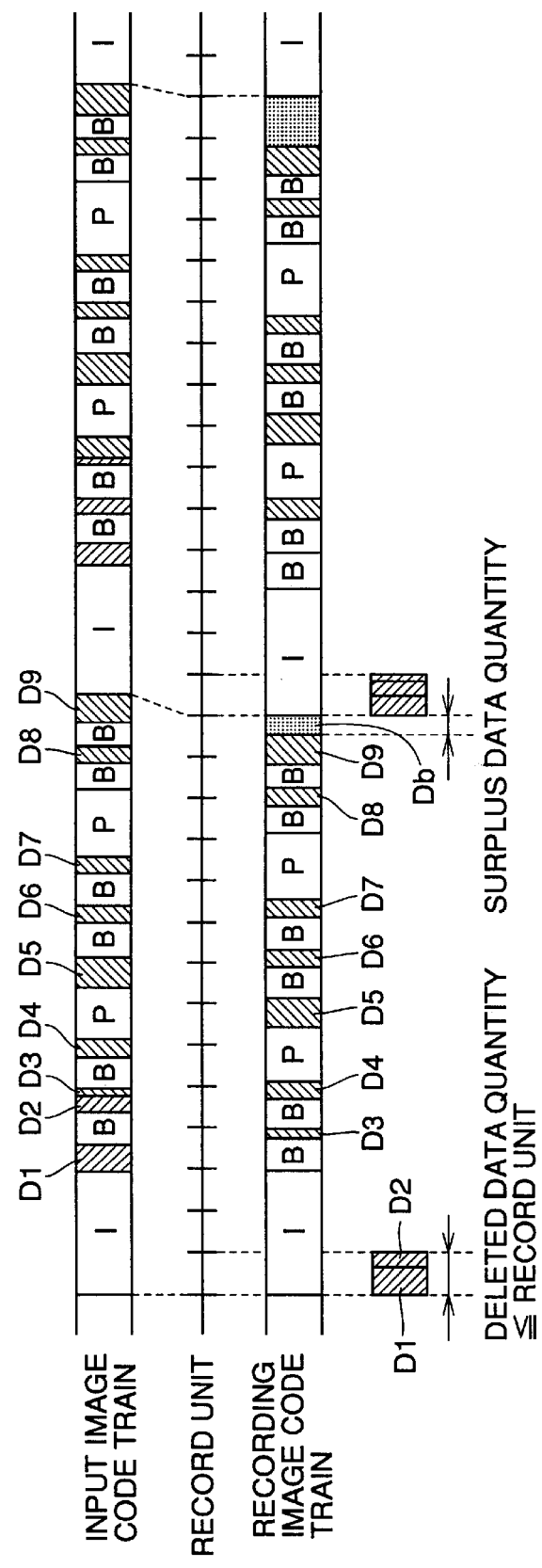
FIG. 8 is an illustration for describing processing by a motion image recording apparatus according to the fourth embodiment of the present invention.

FIG. 8 is an illustration for describing processing of a motion image recording apparatus according to the fourth embodiment of the present invention.

In the motion image recording apparatus according to this embodiment, the method of controlling by redundant bit eliminate control circuit 41 and redundant bit insert control circuit 12 of the motion image recording apparatus according to the third embodiment shown in FIG. 5 is changed.

Specifically, referring to FIG. 8, a redundant bit eliminate control circuit 41 eliminates redundant bits inserted into an input image code train corresponding to one record unit, from the leading end of a GOP period. In FIG. 8, redundant bits D1 and D2 of the input image code train correspond to a redundant bit for one record unit, and only this redundant bit is eliminated. Remaining redundant bits D3–D9 are directly output from a buffer memory 42 without eliminated.

A redundant bit insert control circuit 12 inserts a redundant bit Db into the end of GOP for positioning I-Picture at the leading end of the record unit. An image code train having the data quantity approximately equal to the data quantity of the input image code train can be recorded on a recording medium 15 accordingly, and I-Picture can be detected easily.

Although the frame with its leading end matched with the record unit is represented as I-Picture, P-Picture may be processed similarly.

Figure 9:
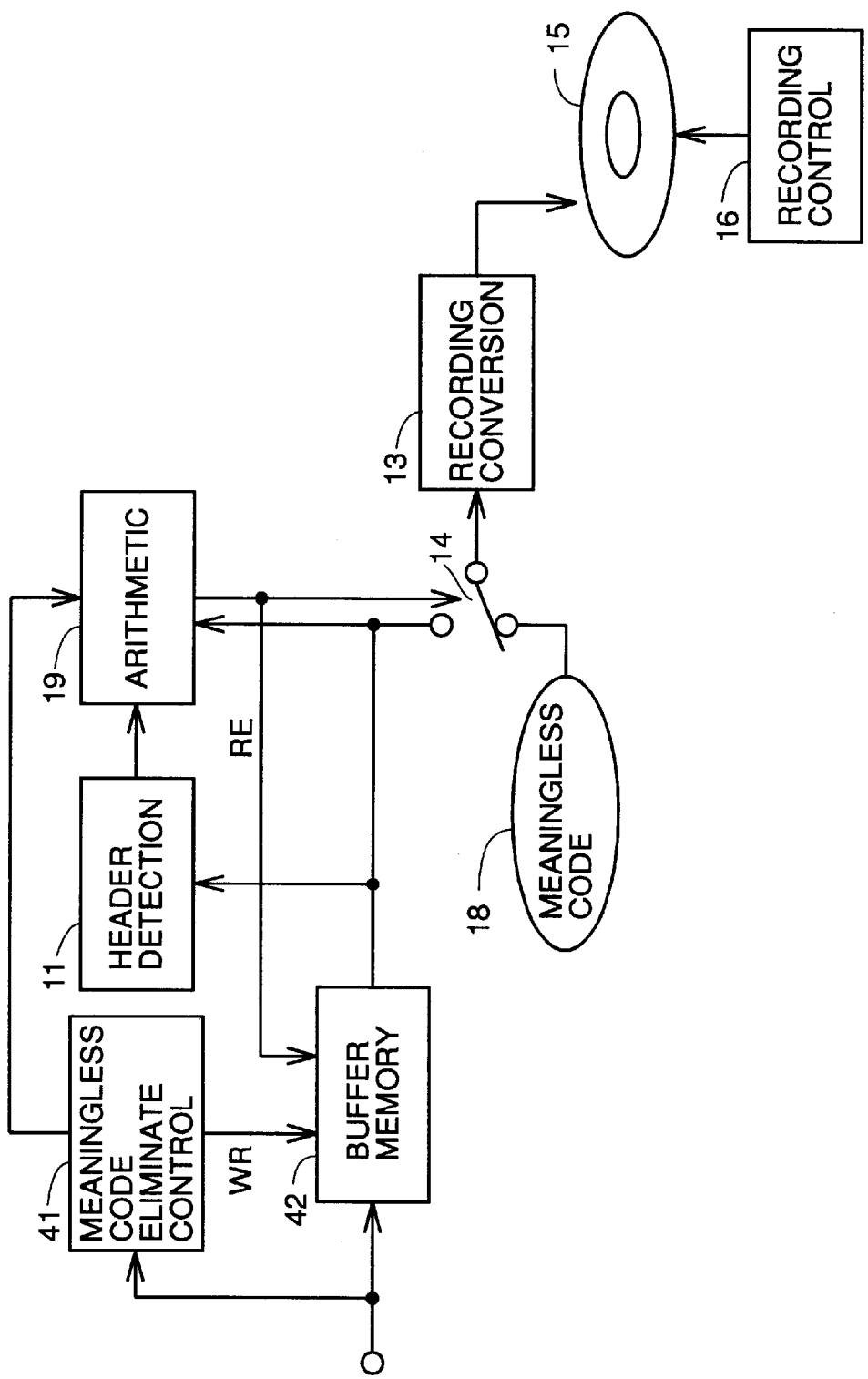
FIG. 9 is a block diagram illustrating a motion image recording apparatus according to the fifth embodiment of the present invention.

FIG. 9 is a block diagram illustrating a structure of a motion image recording apparatus according to the fifth embodiment of the present invention.

In this apparatus, redundant bit insert control circuit 12 of the embodiment shown in FIG. 5 is replaced with an arithmetic circuit 19. In this apparatus, a timing signal from recording control circuit 16, that records the boundary of the record unit in recording on the recording medium, i.e. the last data of the record unit, is not employed.

Arithmetic circuit 19 performs following processing. First, the quantity of data input from a header of a reference frame to a next header is counted according to the timing of detection of a header by a header detection circuit 11. Next, the counted value is divided by the quantity of data of the record unit to determine the remainder. The quantity of the redundant bit to be inserted is calculated by subtracting the determined remainder from the total quantity of the redundant bits eliminated by a redundant bit eliminate control circuit 41.

Arithmetic circuit 19 changes the state of a switch 14 for outputting redundant bit 18 corresponding to the quantity of data to be inserted obtained by the calculation. At the same time, a control signal RE is output for stopping output of a buffer memory 42. After the redundant bit corresponding to the quantity of data to be inserted is output by the switch, the state of switch 14 is changed so as to enable output of buffer memory 17. Control signal RE is simultaneously output for restarting output by the buffer memory. An effect similar to that of the embodiment shown in FIG. 5 is thus obtained.

Figure 10:
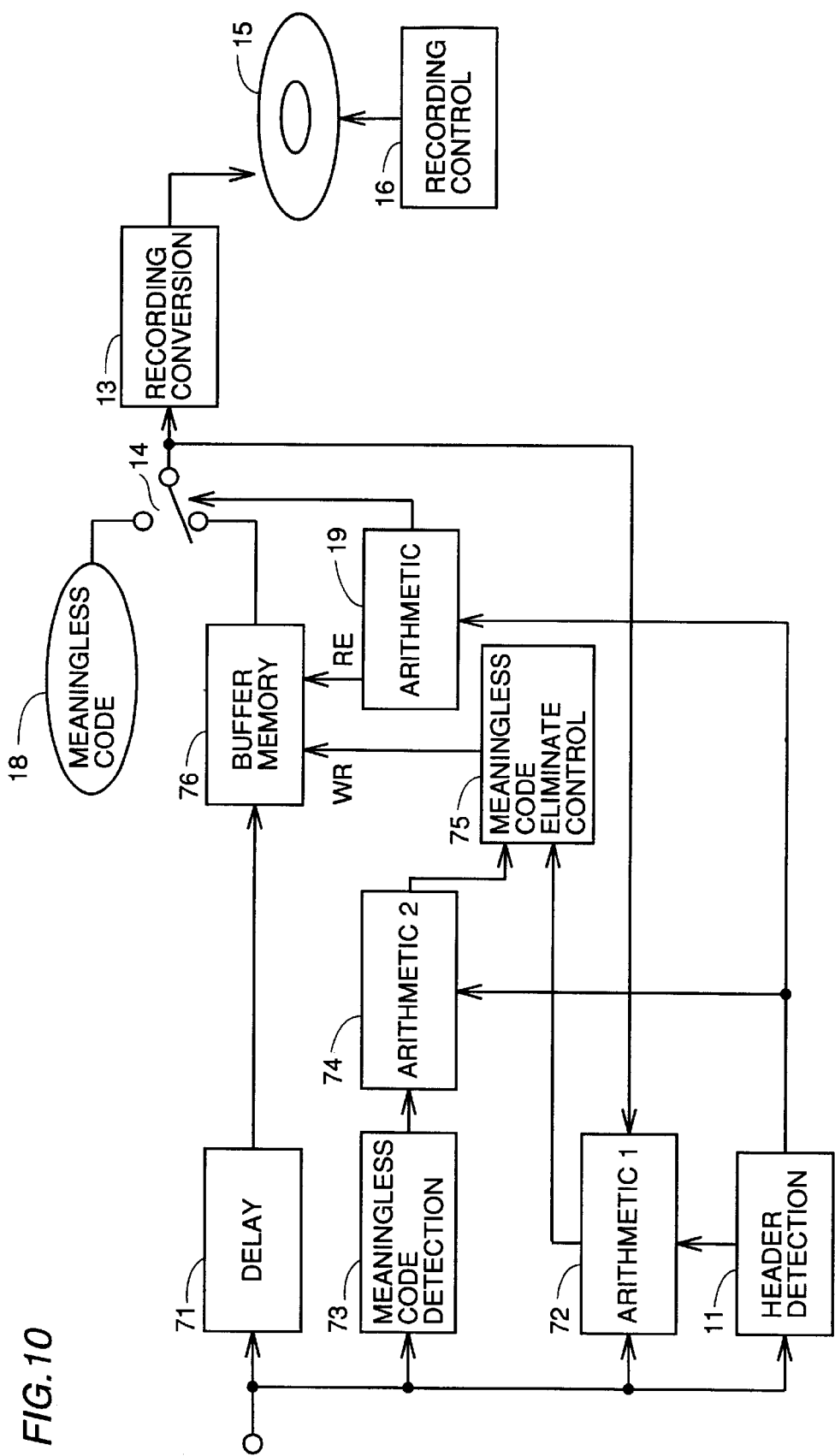
FIG. 10 is a block diagram illustrating a motion image recording apparatus according to the sixth embodiment of the present invention.

FIG. 10 is a block diagram illustrating a structure of a motion image recording apparatus according to the sixth embodiment of the present invention.

According to this embodiment, instead of eliminating all of the redundant bits as those embodiments illustrated in FIGS. 5 and 6, redundant bits added upon coding is eliminated by a necessary quantity, or a newly required quantity of the redundant bits is inserted. The data are recorded in the form close to that of the input image code train as much as possible.

A header detection circuit 11 detects a header of a reference frame for the special reproduction from an input image code train. Header detection circuit 11 further outputs the timing at which the redundant bit is inserted at the leading end of the reference frame, since the timing at which the redundant bit can be inserted corresponds to the leading end of the reference frame.

A first arithmetic circuit 72 calculates a difference between the quantity of data of an input image code train and that of an image code train to be output from a switch 14.

A second arithmetic circuit 74 counts the quantity of data of redundant bits present from the time at which header detection circuit 11 detects a header to the time at which the next header is detected. The redundant bits are inserted for adjusting the quantity of data. The second arithmetic circuit 74 divides the counted total quantity of redundant bits between the headers by the quantity of a record unit. The remainder is calculated as a surplus data quantity.

If the output from switch 14 is less than the input data quantity, the first arithmetic circuit 72 transmits a signal to a redundant bit eliminate control circuit 75 to stop elimination of the redundant bits.

On the contrary, if the output from switch unit 14 exceeds the input data quantity, the first arithmetic circuit 72 provides a signal to redundant bit eliminate control circuit 75, and the redundant bits corresponding to the surplus data quantity determined by the second arithmetic circuit 74 are eliminated.

An arithmetic circuit 19 operates similarly to arithmetic circuit 19 in FIG. 9 to insert a redundant bit to allow a header of a reference frame to be located at the position of the boundary of the record unit if the header is not placed at the boundary.

A delay circuit 71 is a circuit which delays an input image code train by a period in which the surplus data quantity is calculated.

Redundant bit eliminate control circuit 75 outputs a control signal WR to eliminate redundant bits corresponding to the surplus data quantity.

Specifically, the circuit illustrated in FIG. 10 operates as described in (1) and (2) below.

(1) If the data to be output exceed the input data, the redundant bit is reduced to match the leading end of the reference frame with the boundary of the record unit.

(2) If the data to be output are less than the input data, the leading end of the reference frame is matched with the boundary of the record unit by adding a redundant bit.

Figure 11:
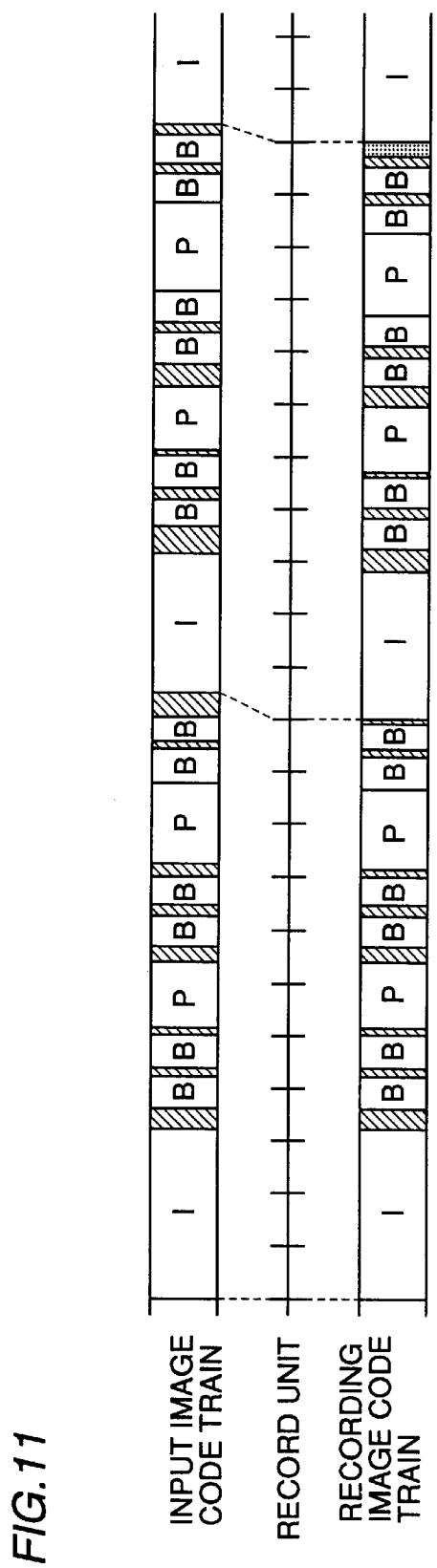
FIG. 11 is an illustration showing an example of processing by the apparatus shown in FIG. 10.

FIG. 11 is an illustration showing one example of processing where the reference frame is only I-Picture.

Referring to FIG. 11, in the GOP period located at the left extreme (from the left broken line to the intermediate broken line), the redundant bits (oblique line regions) inserted upon coding are eliminated such that the leading end of I-Picture located at the leading end of the next GOP period is placed at the closest boundary of record of a recording medium.

The next I-Picture (I-Picture located at the right extreme in the drawing) is placed at the leading end of the closest record unit by inserting a redundant bit into the hatched region.

The processing illustrated in FIG. 11 may be applied to P-Picture.

Figure 12:
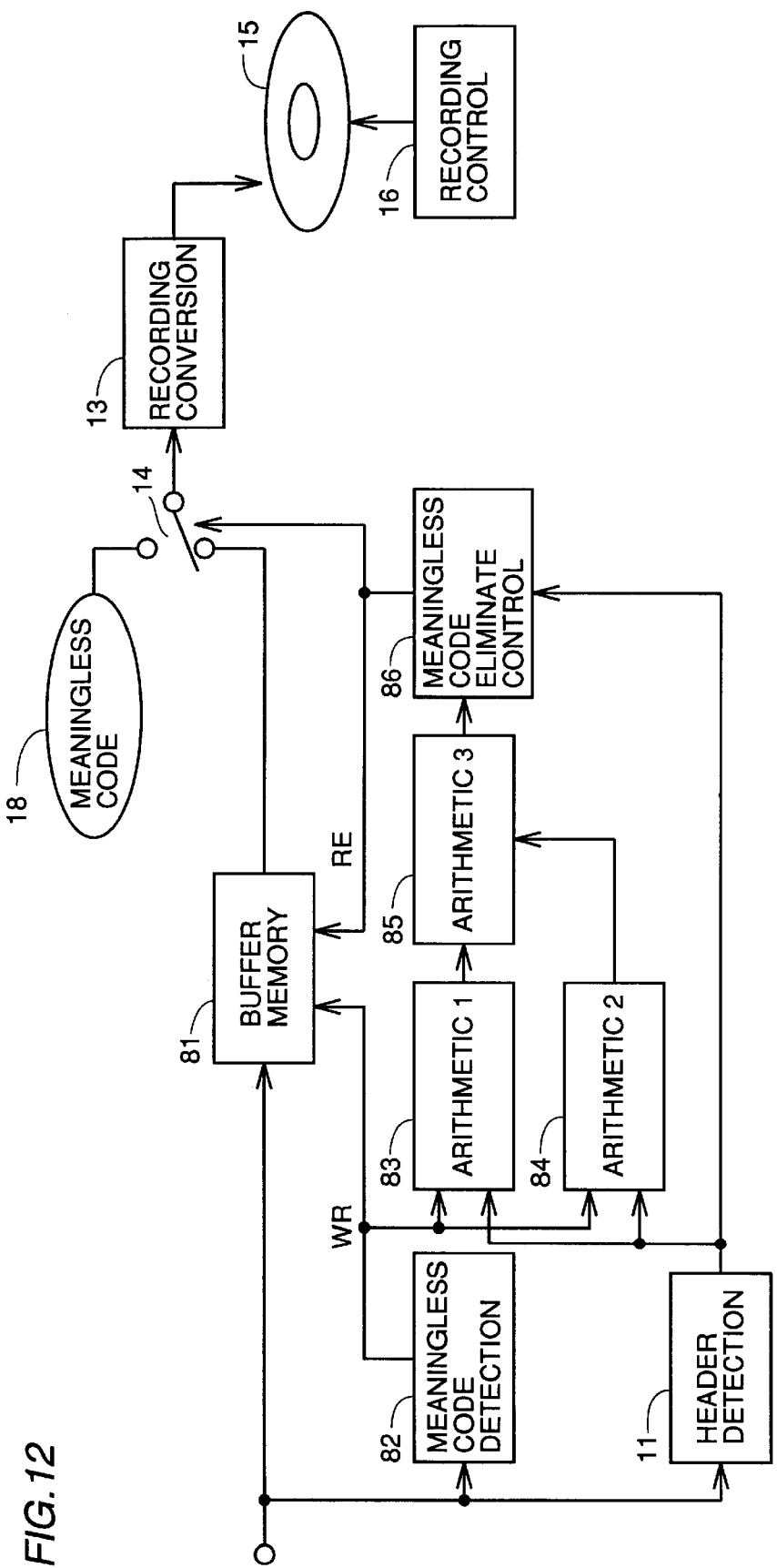
FIG. 12 is a block diagram illustrating a motion image recording apparatus according to the seventh embodiment of the present invention.

FIG. 12 is a block diagram illustrating a structure of a motion picture recording apparatus according to the seventh embodiment of the present invention.

Referring to the drawing, the apparatus includes a buffer memory 81 for inputting and temporarily storing an image code train that is compression-coded frame by frame according to variable-length coding by mixing intra-frame coding and inter-frame coding and has its quantity of data per unit time which is adjusted by inserting upon generation a number of redundant bits having no meaning in reproduction, a header detection circuit 11 detecting, from the image code train input to buffer memory 81, a header corresponding to the start position of coded data of a reference frame that could be a special reproduction frame, a redundant bit detection circuit 82 detecting the redundant bits in the image code train and eliminating the redundant bits from the image code train, a first arithmetic circuit 83 calculating, when a header detection circuit 11 detects the header, the surplus of a recording region generated when the quantity of data of the image code train from which the redundant bits after the previously detected header have been eliminated is divided into record units of a recording medium, a second arithmetic circuit 84 calculating, when header detection circuit 11 detects the header, the number of record units and the remainder obtained by dividing the quantity of data of the redundant bits eliminated after the previous header is detected into record units of the recording medium, a third arithmetic circuit 85 adding 1 to the number of the record units of the divided redundant bits if the difference between the surplus of the recording region output from the first arithmetic circuit 83 and the quantity of the remainder which is one of the outputs from the second arithmetic circuit, a generation circuit 18 generating a new redundant bit, a switching circuit 14 allowing either the image code train input to buffer memory 81 or the redundant bit output from generation circuit 18 to be output, a recording conversion circuit 13 recording an output from switching circuit 14 on the recording medium, and a redundant bit insert control circuit 86 controlling, when header detection circuit 11 detects the header, to stop input of the image code train into buffer memory 81 and to allow switching circuit 14 to newly insert the surplus of the recording region output from the first arithmetic circuit 83 and redundant bits obtained by multiplying the record units of the recording medium resulting from the calculation by the third arithmetic circuit 85 by the integer, and controlling, when the output of the new redundant bits is completed, to allow buffer memory 81 to restart output of an image code train and allow switching circuit 14 to output the image code train.

One example of processing where the reference frame is only I-Picture is described below.

Figure 13:
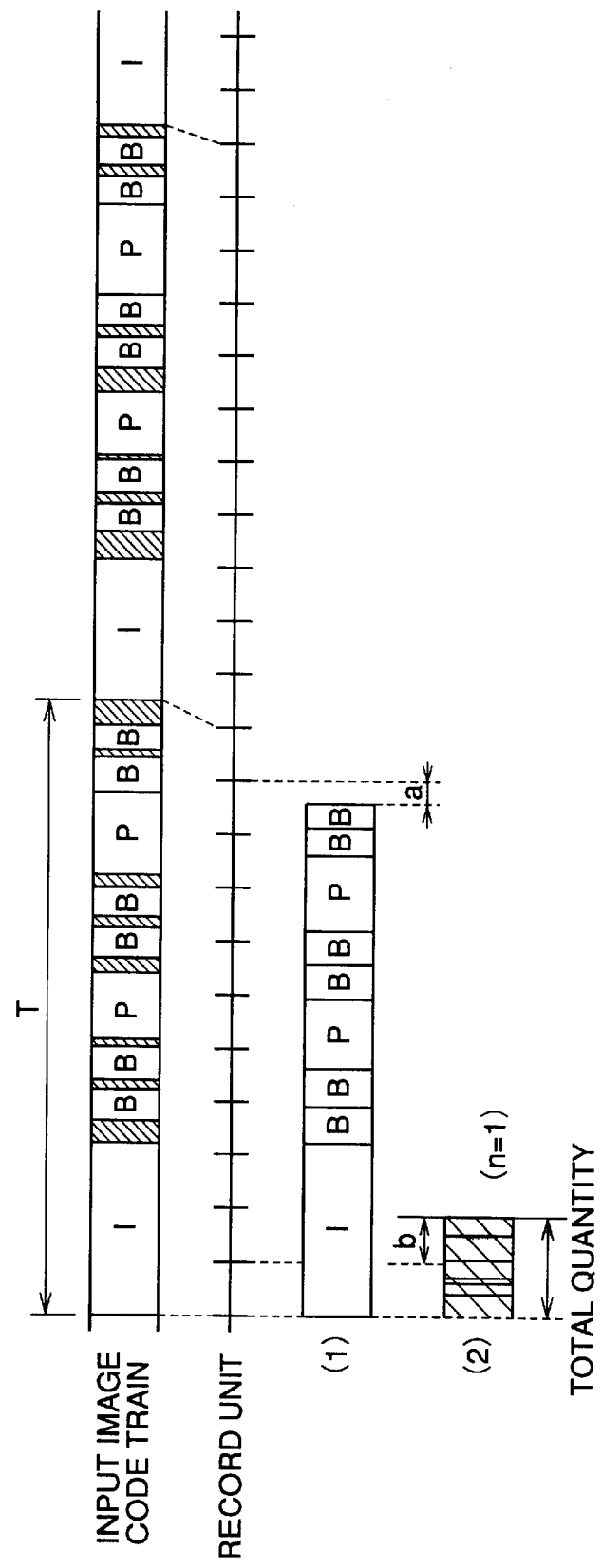
FIG. 13 is a first illustration showing processing performed by the apparatus shown in FIG. 12.

Referring to FIG. 13, a period T between the leading ends of reference frames is identified by detecting headers of the reference frames by the header detection circuit.

The first arithmetic circuit 83 calculates the surplus "a" of a recording region generated when redundant bits are eliminated from the data train in period T and the data quantity thus obtained is divided into record units as represented by (1).

The second arithmetic circuit 84 calculates the total quantity of the eliminated redundant bits in period T, and divides the total quantity by the data quantity of the record unit to determine the quotient "n" (n=1 in the drawing) as represented by (2). In addition, the remainder "b" is determined.

The third arithmetic circuit calculates "b−a". If the result of the calculation is equal to or more than a prescribed value (for example, half of the recorded unit), 1 is added to the value of "n". If the result is less than the prescribed value, no manipulation is performed.

Redundant bit insert control circuit 86 controls to allow redundant bits corresponding to n record units and redundant bits corresponding to the quantity of "a" to be recorded on the recording medium when period T terminates.

Figure 14:
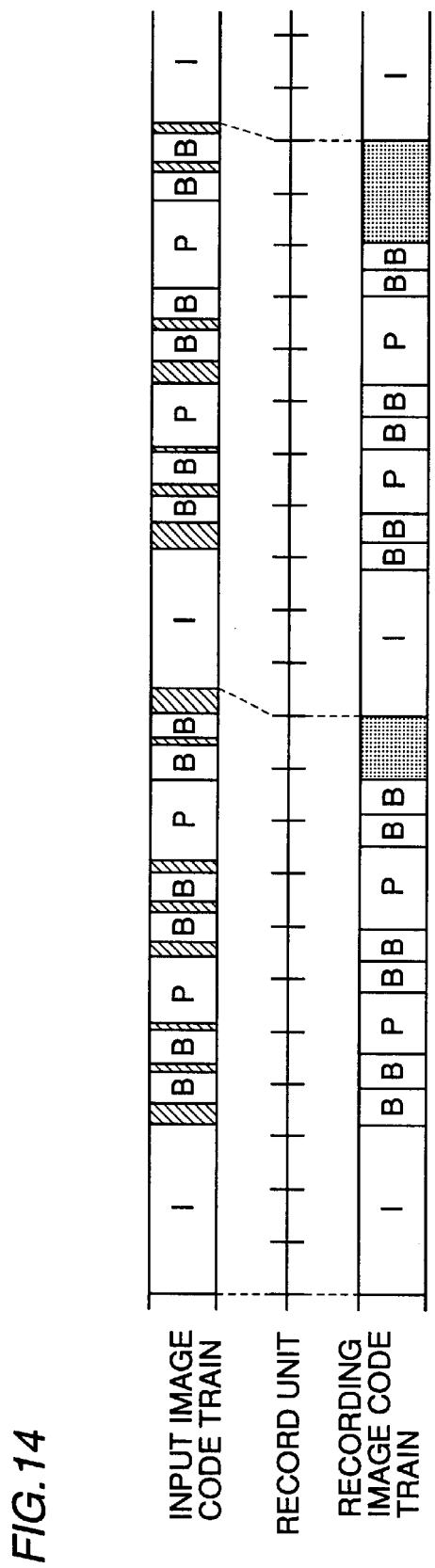
FIG. 14 is a second illustration showing processing performed by the apparatus shown in FIG. 12.

As a result, data having its quantity close to the quantity of the input data train can be recorded on the recording medium as illustrated in FIG. 14. Further, the leading end of a reference frame can be matched with the record unit.

Figure 15:
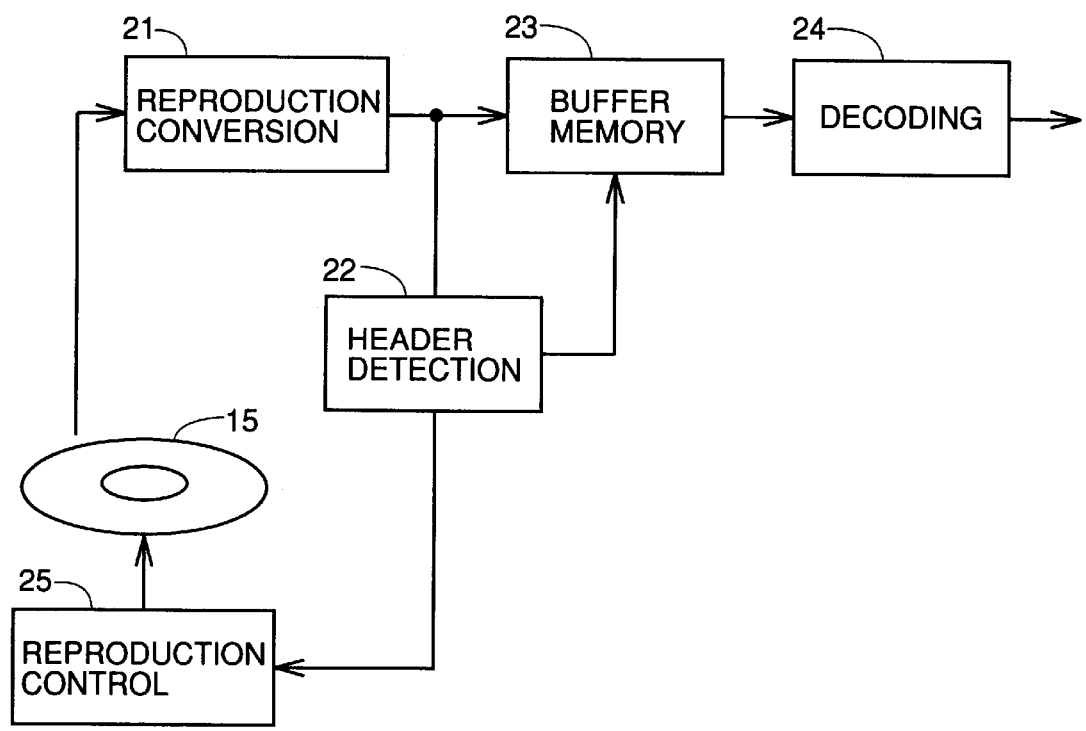
FIG. 15 is a block diagram illustrating a structure of a motion image reproduction apparatus according to the eighth embodiment of the present invention.
Figure 16:
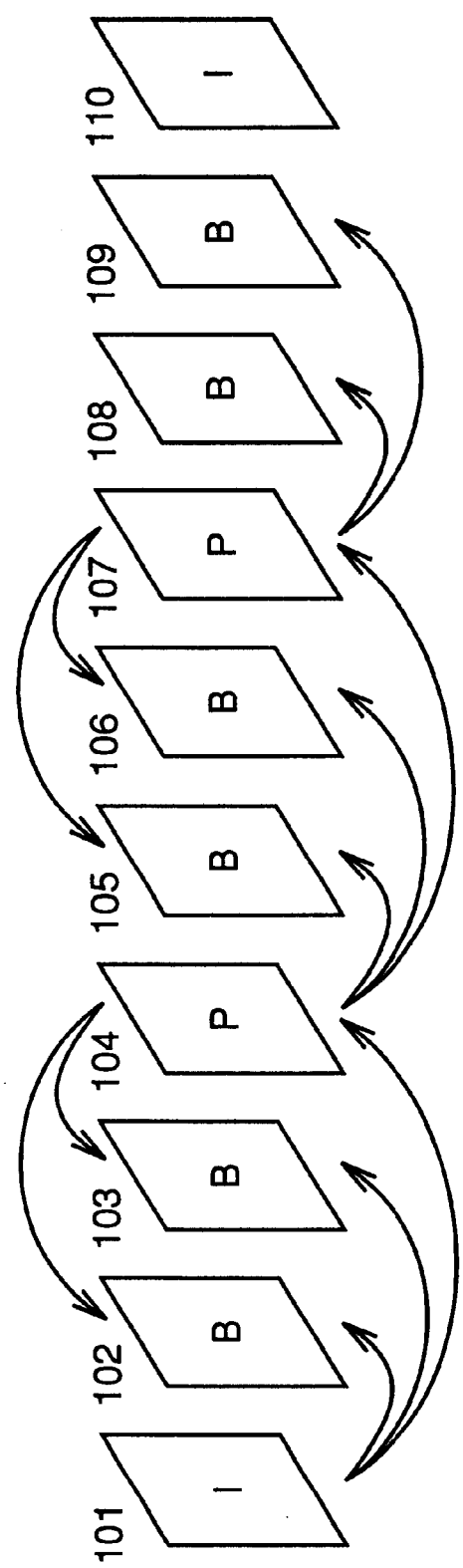
FIG. 16 is an illustration for describing a reference relation between frames according to MPEG2 system.
Figure 17:
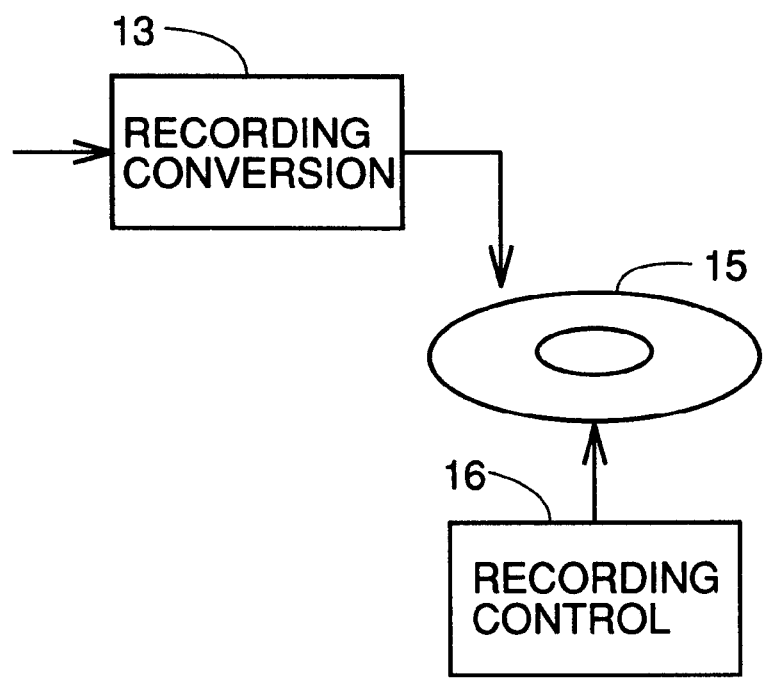
FIG. 17 is a block diagram of a motion image recording apparatus according to a conventional art.
Figure 18:
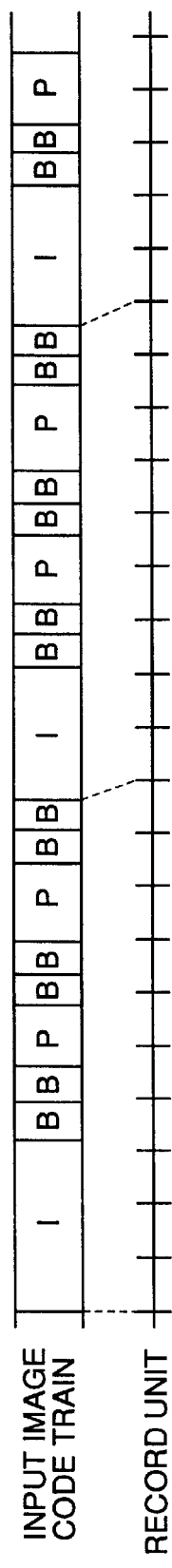
FIG. 18 is an illustration for describing an image code train according to the MPEG2 system.
Figure 19:
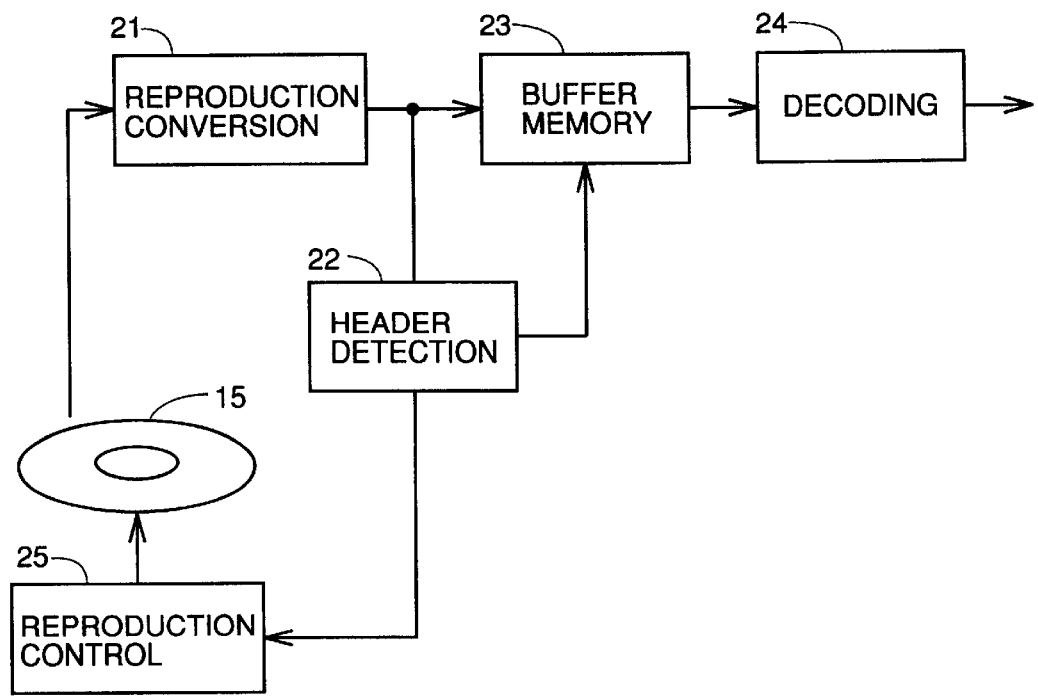
FIG. 19 is a block diagram of a motion image reproduction apparatus according to a conventional art.

FIG. 15 is a block diagram illustrating a structure of a motion image reproduction apparatus according to the eighth embodiment of the present invention.

Referring to the drawing, the apparatus performs reproduction of a recording medium 15 on which recording is done by the motion image recording apparatuses according to the first to the seventh embodiments.

The apparatus includes a reproduction conversion circuit 21 that performs processing such as demodulation, error correction, and cancellation of blocking, a header detection circuit 22 detecting a header of a reference frame to be reproduced in the special reproduction, a buffer memory 23 temporarily storing image data to be reproduced, a decoding circuit 24 decoding data recorded in the buffer memory, and a reproduction control circuit 25 controlling reproduction.

On recording medium 15, the leading end of a frame to be reproduced in the special reproduction is located at the leading end of any record unit. Accordingly, only an image code train located at the leading end of each record unit is read in the special reproduction such as high speed reproduction, reverse high speed reproduction and search. Reproduction control circuit 25 successively controls reading of image code trains from the recording medium in order to find a frame to be reproduced. High speed reading is thus achieved by reading only the leading section of the record unit. As a result, the special reproduction is achieved efficiently.

In a reading apparatus shown in FIG. 15, an efficient reproduction is implemented by controlling to allow only a prescribed quantity of data equal to or less than the record unit to be read from the leading end of the record unit.

Although the high speed reproduction, reverse high speed reproduction, and search are listed as the special reproduction, the special reproduction is not especially limited to these examples.

The redundant bit is a code (train) which is not interpreted in reproduction (decoding). In the normal reproduction, the inserted redundant bits do not affect reproduction at all.

In place of buffer memories shown in FIGS. 15, 5, 8, 9 and 11, a reading unit that reads image data recorded on another recording medium may be provided to the apparatus and the read data may be processed.

Industrial Applicability

According to the embodiments of the present invention as described above, the special reproduction such as the high speed reproduction and reverse reproduction can be performed easily by allowing a leading end of an image code train of a frame to be reproduced in the special reproduction to be always located at the boundary of a record unit on a recording medium. Accordingly, the present invention is advantageously applicable to the fields of the motion image recording apparatus and reproduction apparatus.

What is claimed is:

1. A motion image recording apparatus comprising:

input means for inputting an image code train compressed frame by frame according to intra-frame coding or inter-frame coding;

detection means for detecting a specific frame from said input image code train; and control means for controlling to allow said detected specific frame to match a record unit of a recording medium and to be recorded; wherein said control means include insert means for inserting a code into said input images code train to allow said detected specific frame to match the record unit of the recording medium and to be recorded;

said input image code train includes a code which is not interpreted in reproduction, and said control means include delete means for deleting said code which is not interpreted in reproduction to allow said detected specific frame to match the record unit of the recording medium and to be recorded.

2. A motion image recording apparatus, comprising:

input means for inputting an image code train compressed frame by frame according to intra-frame coding or inter-frame coding;

detection means for detecting a specific frame from said input image code train; and control means for controlling to allow said detected specific frame to match a record unit of a recording medium and to be recorded, wherein said control means includes insert means for inserting a code into said input image code train to allow said detected specific frame to match the record unit of the recording medium and to be recorded, and wherein said control means include measure means for measuring the quantity of codes between a leading end of the specific frame and a leading end of a next specific frame based on the result of detection by said detection means.

3. A motion image recording apparatus, comprising:

input means for inputting an image code train compressed frame by frame according to intra-frame coding or inter-frame coding;

detection means for detecting a specific frame from said input image code train; and control means for controlling to allow said detected specific frame to match a record unit of a recording medium and to be recorded, wherein said control means includes insert means for inserting a code into said input image code train to allow said detected specific frame to match the record unit of the recording medium and to be recorded, said input image code train includes a code which is not interpreted in reproduction, said control means include delete means for deleting said code which is not interpreted in reproduction to allow said detected specific frame to match the record unit of the recording medium and to be recorded, and wherein said control means include measure means for measuring the quantity of codes between a leading end of the specific frame and a leading end of a next specific frame based on the result of detection by said detection means.

4. The motion image recording apparatus according to claim 1, wherein said control means control to allow the quantity of said input image code train to be approximately equal to the quantity of an image code train to be recorded.

5. A motion image recording apparatus, comprising:

input means for inputting an image code train compressed frame by frame according to intra-frame coding or inter-frame coding;

detection means for detecting a specific frame from said input image code train; and control means for controlling to allow said detected specific frame to match a record unit of a recording medium and to be recorded, wherein said control means includes insert means for inserting a code into said input image code train to allow said detected specific frame to match the record unit of the recording medium and to be recorded, wherein said control means include:

first arithmetic means for calculating a difference between the quantity of said input image code train and the quantity of an image code train to be recorded;

second arithmetic means for counting the quantity of codes that are located between said detected specific frames and are not interpreted in reproduction, and dividing the counted quantity by the record unit to calculate the remainder; and delete means for deleting a code which is not interpreted in reproduction based on the result of calculation by the first and second arithmetic means.

6. A motion image recording apparatus comprising:

input means for inputting an image code train compressed frame by frame according to intra-frame coding or inter-frame coding;

detection means for detecting a specific frame from said input image code train; and control means for controlling to allow said detected specific frame to match a record unit of a recording medium and to be recorded; wherein said control means include:

first arithmetic means for calculating a difference between the quantity of said input image code train and the quantity of an image code train to be recorded;

second arithmetic means for counting the quantity of codes that are located between said detected specific frames and are not interpreted in reproduction, and dividing the counted quantity by the record unit to calculate the remainder; and delete means for deleting a code which is not interpreted in reproduction based on the result of calculation by the first and second arithmetic means.

7. A motion image recording apparatus comprising;

input means for inputting an image code train compressed frame by frame according to intra-frame coding or inter-frame coding;

detection means for detecting a specific frame from said input image code train; and control means for controlling to allow said detected specific frame to match a record unit of a recording medium and to be recorded; wherein said control means include:

eliminate means for eliminating a code contained ins aid input image code train. and not interpreted in reproduction;

first arithmetic means for calculating the remainder of a recording region by dividing the quantity of data of an image code train located between said detected specific frames from which the code which is not interpreted in reproduction has been eliminated into said record units;

second arithmetic means for calculating the quotient and the remainder obtained when the quantity of the removed code located between said detected specific frames and not interpreted in reproduction is divided by said record unit; and insert means for inserting a code which is not interpreted in reproduction into said input image code train based on the result of calculation by said first and second arithmetic means.

* * * * *